US008090167B1

(12) United States Patent
Scorcioni et al.

(10) Patent No.: US 8,090,167 B1
(45) Date of Patent: Jan. 3, 2012

(54) NEURONAL MEASUREMENT TOOL

(75) Inventors: Ruggero Scorcioni, Arlington, VA (US);
Giorgio A. Ascoli, Fairfax Station, VA
(US); Sridevi Polavaram, Fairfax, VA
(US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 1034 days.

(21) Appl. No.: 11/866,593

(22) Filed: Oct. 3, 2007

Related U.S. Application Data

(60) Provisional application No. 60/828,138, filed on Oct. 4, 2006.

(51) Int. Cl.
*G06K 9/00* (2006.01)
(52) U.S. Cl. ..................... 382/128; 128/922
(58) Field of Classification Search .............. 382/100, 382/128, 129, 130, 131, 132, 155, 159, 160, 382/224, 225, 226, 227, 228; 128/922; 378/4–27
See application file for complete search history.

(56) References Cited

U.S. PATENT DOCUMENTS

| | | | | |
|---|---|---|---|---|
| 5,231,580 A * | 7/1993 | Cheung et al. | ................ | 382/128 |
| 5,519,789 A * | 5/1996 | Etoh | ............................. | 382/225 |
| 7,369,696 B2 * | 5/2008 | Arini et al. | ..................... | 382/133 |
| 7,706,591 B2 * | 4/2010 | Ramer et al. | ................... | 382/133 |
| 7,711,174 B2 * | 5/2010 | Sammak et al. | .............. | 382/133 |
| 2005/0207633 A1 * | 9/2005 | Arini et al. | ..................... | 382/133 |
| 2009/0153659 A1 * | 6/2009 | Landwehr et al. | ............ | 348/135 |

* cited by examiner

*Primary Examiner* — Anand Bhatnagar
(74) *Attorney, Agent, or Firm* — David Grossman; Edgar Rodriguez

(57) ABSTRACT

A neuronal measurement tool including: an input module, a grouping module, a metric selection module, a statistical test selection module, a raw measurement module, a clustering module and a statistical test module. The input module inputs digitally reconstructed neuronal morphologies. The grouping module groups the digitally reconstructed neuronal morphologies into groups. The metric selection module selects at least one metric of interest. The statistical test selection module selects a statistical test method. The raw measurement module gathers raw measurements associated with the metric(s) of interest on the digitally reconstructed neuronal morphologies. The clustering module clusters the raw measurements into groups and the statistical test module performs the statistical test method between the raw measurements clustered in the groups.

24 Claims, 19 Drawing Sheets

| Soma_Surface | Length | Branch_pathlength | Bif_ampl_remote |
| --- | --- | --- | --- |
| N_stems | Surface | Contraction | Bif_ampl_remote |
| N_bifs | Section Area | Fragmentation | Bif_tilt_remote |
| N_branch | Volume | Daughter_Ratio | Bif_torque_remote |
| N_tips | EucDistance | Parent_Daughter_Ratio | Last_parent_diam |
| Width | PathDistance | Partition_asymmetry | Diam_threshold |
| Height | Branch_Order | Rall_Power | HillmanThreshold |
| Depth | Terminal_degree | Pk | Fractal dimension |
| Type | TerminalSegment | Pk_classic | Helix |
| Diameter | Taper_1 | Pk_2 | |
| Diameter_pow | Taper_2 | Bif_ampl_local | |

FIG. 9

| | | | | | | |
|---|---|---|---|---|---|---|
| C10261.txt.swc | Length | 18523 1703 | (6) | 0.5 | 10.8767 | 625.13 | 23.9776 | 24.2242 |
| C10261.txt.swc | Surfac | 20163.2 | 1703 | (6) | 0.471239 | 11.8398 | 589.171 | 8.45969 |
| C10261.txt.swc | Volume | 2553.38 | 1703 | (6) | 0.0353429 | 1.49934 | 316.898 | 27.5314 |
| C11563.txt.swc | Length | 18150.1 | 1337 | (6) | 0.5 | 13.5752 | 661.584 | 26.44 |
| C11563.txt.swc | Surfac | 17891.7 | 1337 | (6) | 0.471239 | 13.382 | 623.528 | 3.16725 |
| C11563.txt.swc | Volume | 1534.54 | 1337 | (6) | 0.0353429 | 1.14775 | 73.1306 | |

FIG. 10

| Function_name | Statistic | N1 | Mean1 | SD1 | N2 | Mean2 | SD2 | Wilcoxon_P_Values |
|---|---|---|---|---|---|---|---|---|
| Volume | Sum | 18 | 4589.644 | 2136.163 | 14 | 23514.17 | 12191.56 | 2.15E-06 |
| Length | Sum | 18 | 40036 | 15642.62 | 14 | 22678.82 | 9272.844 | 0.0015 |
| Surface | Sum | 18 | 40917.58 | 16131.78 | 14 | 62631.04 | 29846.61 | 0.024 |

FIG. 11

| Function_name | Statistic | N1 | Mean1 | SD1 | N2 | Mean2 | SD2 | Wilcoxon_P_Values |
|---|---|---|---|---|---|---|---|---|
| Surface | Sum | 23 | 31025.79 | 6801.545 | 18 | 19209.66 | 1334.243 | 1.14E-07 |
| Volume | Sum | 23 | 3252.161 | 784.9283 | 18 | 2098.422 | 521.9934 | 5.75E-06 |
| Length | Sum | 23 | 30161.06 | 7096.311 | 18 | 18478.03 | 2141.237 | 5.88E-07 |

FIG. 12

| | | | | | | |
|---|---|---|---|---|---|---|
| ok_m79_diana.CNGtree1.swc | Length | 1243.28 | 260 | -1 | 0.276586 | 4.78185 | 51.5976 | 4.18747 |
| ok_m79_diana.CNGtree1.swc | Surface | 1783.33 | 260 | -1 | 0.347569 | 6.85895 | 85.9123 | 6.77681 |
| ok_m79_diana.CNGtree1.swc | Volume | 220.884 | 260 | -1 | 0.03162 | 0.849555 | 11.3834 | 1.03208 |
| ok_m79_diana.CNGtree2.swc | Length | 2742.32 | 562 | -1 | 0.295466 | 4.87957 | 42.9352 | 4.48142 |
| ok_m79_diana.CNGtree2.swc | Surface | 3046.19 | 562 | -1 | 0.277987 | 5.42026 | 756.704 | 26.2555 |
| ok_m79_diana.CNGtree2.swc | Volume | 1409.62 | 562 | -1 | 0.009035 | 2.50821 | 1061.28 | 36.2746 |
| ok_m79_diana.CNGtree3.swc | Length | 857.777 | 210 | -1 | 0.120416 | 4.08465 | 33.9444 | 4.20805 |
| ok_m79_diana.CNGtree3.swc | Surface | 1652.37 | 210 | -1 | 0.072715 | 7.86844 | 371.106 | 23.9676 |
| ok_m79_diana.CNGtree3.swc | Volume | 800.512 | 210 | -1 | 0.002363 | 3.81196 | 322.862 | 19.4703 |
| ok_m79_diana.CNGtree4.swc | Length | 382.098 | 70 | -1 | 0.669104 | 5.45854 | 38.7557 | 5.31265 |
| ok_m79_diana.CNGtree4.swc | Surface | 800.832 | 70 | -1 | 0.273267 | 11.4405 | 309.257 | 31.7414 |
| ok_m79_diana.CNGtree4.swc | Volume | 317.59 | 70 | -1 | 0.008881 | 4.537 | 196.378 | 19.5628 |
| ok_m79_diana.CNGtree5.swc | Length | 472.161 | 94 | -1 | 0.436578 | 5.02299 | 34.193 | 5.21704 |
| ok_m79_diana.CNGtree5.swc | Surface | 653.617 | 94 | -1 | 0.618437 | 6.95337 | 183.096 | 16.1591 |
| ok_m79_diana.CNGtree5.swc | Volume | 155.929 | 94 | -1 | 0.020099 | 1.65882 | 92.0057 | 7.69577 |
| ok_m79_diana.CNGtree6.swc | Length | 465.93 | 85 | -1 | 0.257099 | 5.48153 | 44.1856 | 5.14188 |
| ok_m79_diana.CNGtree6.swc | Surface | 554.937 | 85 | -1 | 0.197941 | 6.52867 | 204.055 | 17.9113 |
| ok_m79_diana.CNGtree6.swc | Volume | 105.352 | 85 | -1 | 0.006433 | 1.23944 | 74.9903 | 6.54419 |
| ok_m79_diana.CNGtree7.swc | Length | 763.258 | 144 | -1 | 0.850882 | 5.3004 | 45.9211 | 4.96933 |
| ok_m79_diana.CNGtree7.swc | Surface | 1003.93 | 144 | -1 | 0.347506 | 6.97176 | 327.482 | 22.7599 |
| ok_m79_diana.CNGtree7.swc | Volume | 297.204 | 144 | -1 | 0.011294 | 2.06392 | 185.846 | 12.8148 |
| ok_m79_diana.CNGtree8.swc | Length | 1019.94 | 196 | -1 | 0.156205 | 5.2038 | 30.2595 | 4.51422 |
| ok_m79_diana.CNGtree8.swc | Surface | 1212.77 | 196 | -1 | 0.063795 | 6.18761 | 317.51 | 20.9296 |
| ok_m79_diana.CNGtree8.swc | Volume | 452.687 | 196 | -1 | 0.002073 | 2.30963 | 265.121 | 16.0495 |
| ok_m79_diana.CNGtree9.swc | Length | 1040.7 | 202 | -1 | 0.778974 | 5.15196 | 26.139 | 4.09734 |
| ok_m79_diana.CNGtree9.swc | Surface | 1223.87 | 202 | -1 | 0.490378 | 6.05876 | 186.408 | 12.6091 |
| ok_m79_diana.CNGtree9.swc | Volume | 246.372 | 202 | -1 | 0.015937 | 1.21967 | 105.787 | 6.52284 |

FIG. 13

NEURONAL MEASUREMENT TOOL

CROSS-REFERENCE TO RELATED APPLICATIONS

This application claims the benefit of U.S. Provisional Application No. 60/828,138, filed Oct. 4, 2006, entitled "Neuronal Measurement Tool," which is hereby incorporated by reference in its entirety.

STATEMENT REGARDING FEDERALLY SPONSORED RESEARCH OR DEVELOPMENT

This invention was made with government support under contract No. RO1 NS396007 awarded by National Institute of Health. The government has certain rights in the invention.

BRIEF DESCRIPTION OF THE DRAWINGS

The following drawings describe some embodiments of the present invention.

FIG. 4 shows a security request as per an aspect of an embodiment of the present invention.

FIG. 6 shows a function panel with statistical features enabled as per an aspect of an embodiment of the present invention.

FIG. 9 shows a table itemizing metrics available in LM as per an aspect of an embodiment of the present invention.

FIG. 10 shows volume, length, and surface data extracted during an example analysis executed on two neurons using an embodiment of the present invention.

FIG. 11 shows the results of an example statistical analysis on two set of neurons based on Volume, Length, and Surface data using an embodiment of the present invention.

FIG. 12 shows the results of another example statistical analysis on two sets of neurons based on Volume, Length, and Surface data using an embodiment of the present invention.

FIG. 13 shows statistically analyzed outputs from two examples using an embodiment of the present invention.

DETAILED DESCRIPTION OF EMBODIMENTS

Several embodiments will now be described in detail with reference to the accompanying drawings. It should be understood that the embodiments and the accompanying drawings have been described for illustrative purposes and the present invention is limited only by the claims.

Embodiments of the present invention allow measurements of morphological characteristics from reconstructions of neuronal features. Common neuroanatomical measurements may be computed using more than 40 metrics. Three features disclosed include: (a) the ability to statistically compare two set of neurons, (b) the ability to perform morphological searches based on any Boolean combination of the available metrics, and (c) the ability to perform morphological studies based on individual trees instead of the whole neuron. These features should allow the neuroanatomist to focus on the research aspect neuronal investigation while leaving complex computational operations to automated procedures. Embodiments of the tool may be accessed either online from a Java-enabled platform or run locally under Windows or Linux. Those skilled in the art will recognize that embodiments may be created that will run on other computational platforms such as Sun workstations or browsers using plugins written in languages such visual basic or C.

Figure 1:
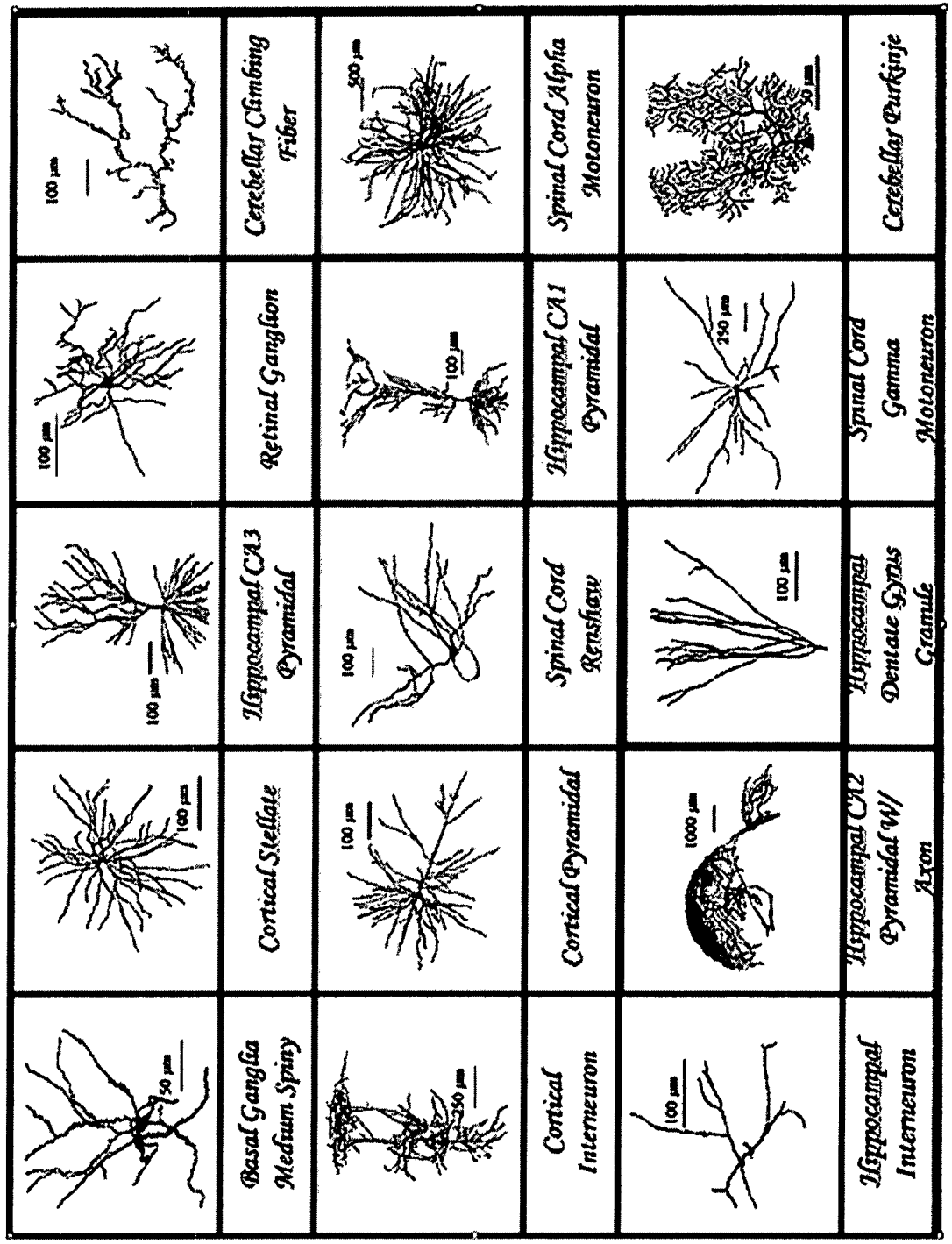
FIG. 1 shows a representative collection of 3D digital reconstructions shared in the neuroscience community.

The study of neuronal morphology is an important step in attempting to correlate structure, activity, and function in the nervous system at the cellular level. An increasing number of laboratories are freely sharing their 3D neuronal reconstructions with the neuroscience community to maximize the impact of their results. For example, FIG. 1 shows a representative collection of 3D digital reconstructions shared in the neuroscience community (these are graphical illustrations of files that embodiments of present invention might analyze).

These digital data files are extremely time-consuming and technically challenging to collect, and are useful in computational modeling and comparative analyses. It is hoped that on-line embodiments of the present invention will be used by the neuroscience community (and others) to routinely measure, search and statistically analyze these raw data.

Embodiments of the present invention enable one to capitalize on the value of these digital files. Additionally, embodiments may be used to enhance neuronal measurement tools such as L-Measure. L-Measure allows researchers to extract quantitative morphological measurements from neuronal reconstructions and is available from the Krasnow Institute at George Mason University in Fairfax, Va. Some of the following descriptions will refer to such an enhanced version(s) of L-Measure as (LM) as example(s) of embodiments of the present invention.

Figure 2:
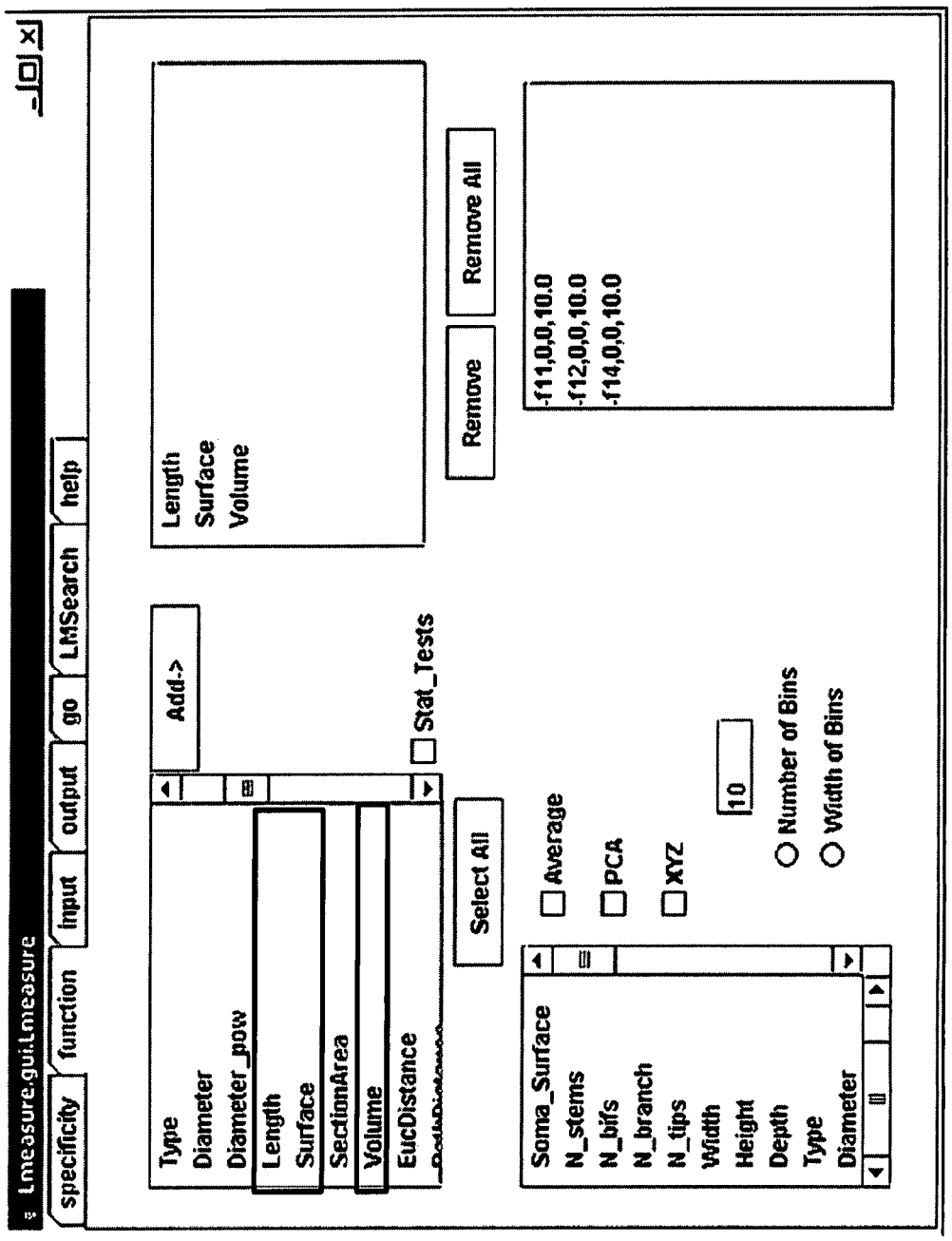
FIG. 2 shows an L-Measure Function panel as per an aspect of an embodiment of the present invention.

FIG. 2 shows an L-Measure Function panel of such an enhanced version of the tool. Embodiments (such as that shown in shown in FIG. 2) may extract morphometric parameters from neuronal reconstructions in a variety of formats (e.g. SWC, Eutectic, Neurolucida). Neuronal morphology can be quantified with different geometrical and topological measurements (e.g. Diameter, Length, Angles). Measures may be returned as raw values or summary metrics (Total Sum, Minimum, Average, Maximum, Standard Deviation). Tools like LM may extract morphometric relations of any two functions (e.g. number of bifurcations vs. path distance), and specify sub-domains within the arborization (e.g. restrict analysis to trees with at least 10 terminals).

An embodiment of L-Measure (LM) has two main components. The engine, written in C++, is dedicated to the numerical extraction of the statistical data from the input files. The graphical user interface, written in java, reads point and click commands from the mouse/screen and translates them to the engine. The engine may also be used directly via command line (e.g. for large automatic batch processes). LM outputs may be visualized on the screen and/or saved in a file (e.g. Microsoft Excel format). This embodiment of LM is multi-platform so that it can be executed on multiple machines such as Windows and Linux machines. Additionally, on-line versions, (such as may be found at http://krasnow.gmu.edu/L-Neuron—case specific) additionally allows the use of the tool through any (Java-enabled) internet-connected browser and platform.

Three new features of LM are disclosed: an on-line Java based extraction function that can perform statistical analysis, a content-based search on neuronal morphological digital files, and analysis by tree stem.

Figure 3:
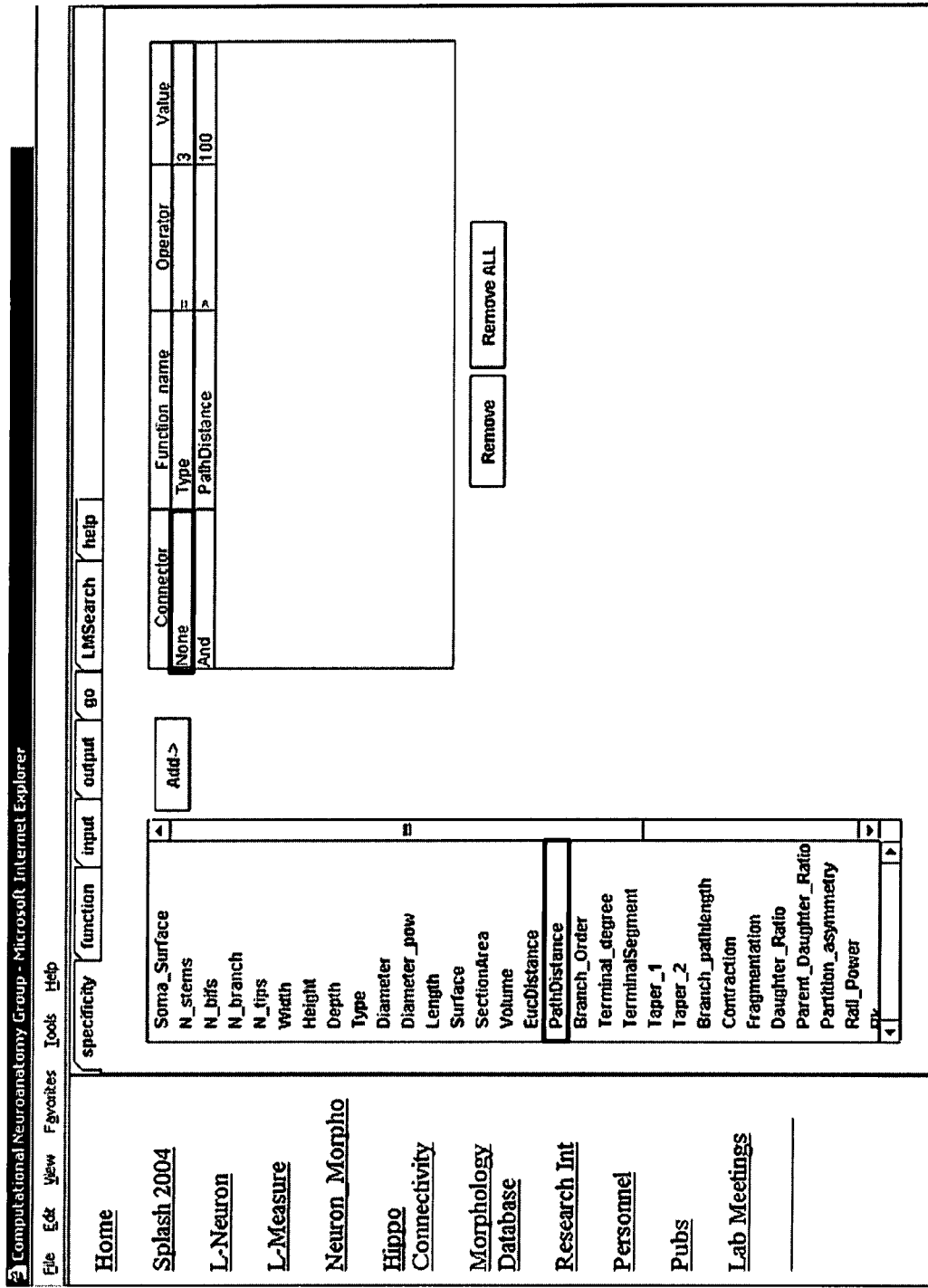
FIG. 3 shows an L-Measure applet within a browser as per an aspect of an embodiment of the present invention.

An online embodiment is based on a Java applet that loads within a Java enabled web browser like Internet Explorer, Netscape, Firefox, and others. This Java applet communicates with a Linux server to execute user directives. FIG. 3 shows an example of such an L-Measure applet within a Firefox browser.

Figure 4:
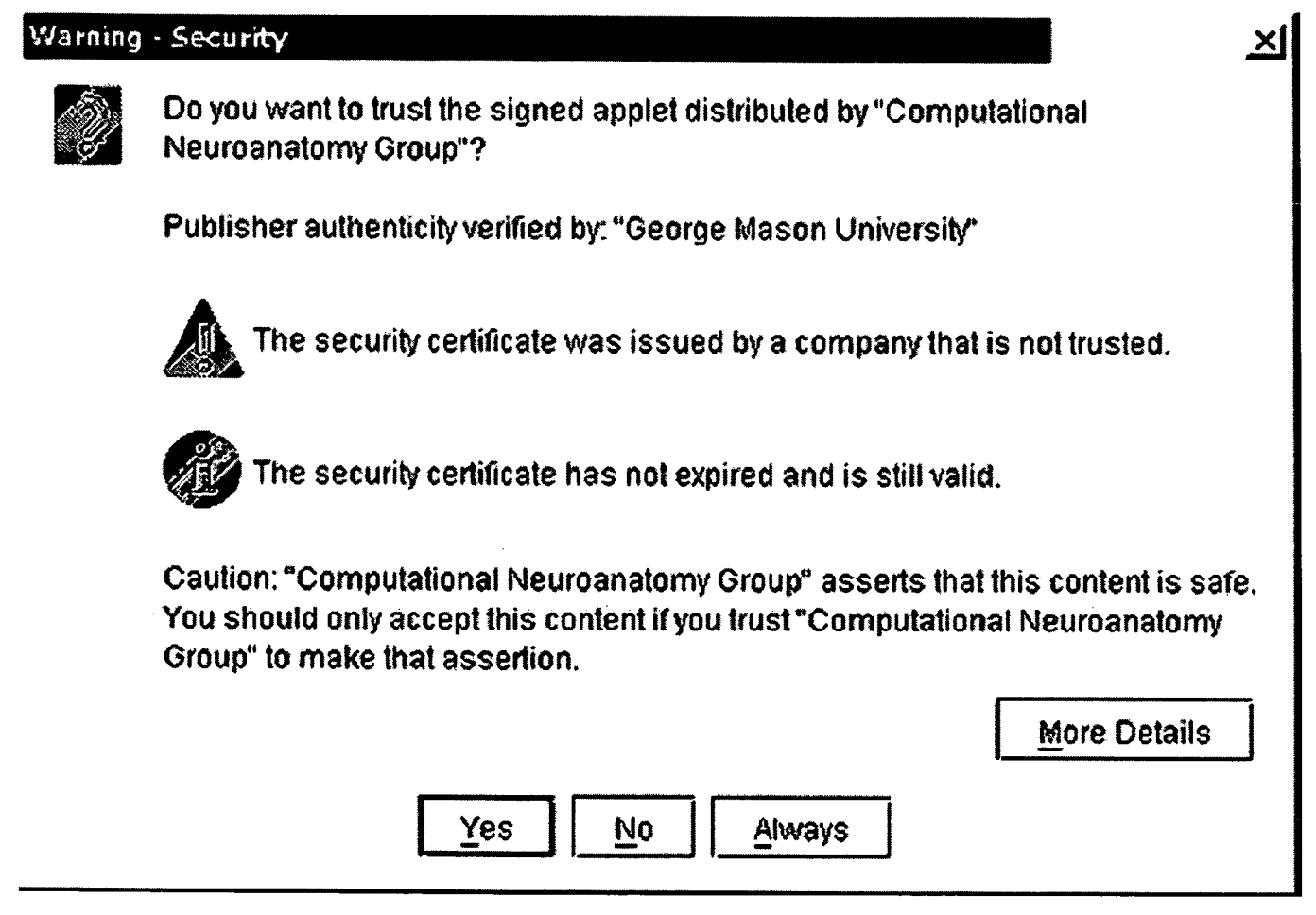

The applet may require enhanced security permission allowed by the user via signed certificate. FIG. 4 shows an example security request that requests permission to load the applet. Granting the signed certificates allows Java applet to read/write data from the user hard disk.

This applet implementation allows support for multiple platforms. All heavy computational tasks may be redirected to CNG servers for immediate execution. Data and commands may be exchanged between the local user machine and the remote CNG server via a secure channel. A series of steps may be required to run the applet, in particular:
1) open a browser
2) go to an appropriate web address (such at krasnow.gmu.edu under the Computational Neuroanatomy Group page.)
3) select L-Measure from the left side frame
4) click on Online version
5) at the security prompt accept the signed certificate
6) wait for the applet to load FIG. 9 shows a Table itemizing some metrics that may be used in LM. They include geometrical, angular, topological, and stereological measurements.

Making statistical comparisons between two groups of neurons using embodiments will now be discussed. Generally, scientific studies base their results on statistical differences between two groups: the experimental group and the control group. Embodiments of this new version LM provides a user-friendly, flexible, and automated implementation of statistical comparisons between two groups of neurons. The user may select a mixture of directories and/or individual files to determine each group. Once the two groups are created, it should be possible to select the appropriate statistical analysis. Two types of tests that may be selected include the Student T-test and the Wilcoxon Rank-sum test. The Student T-test is a commonly used two-sample, mean-based test that assumes that both samples have normal distribution with equal variances. The Wilcoxon Rank-sum test is a non-parametric alternative for Student T-test, making no assumption on distribution types, and is often better suited for small sample sizes.

LM allows a multitude of potential statistics to be automatically tested. Without corrections, the reported P-values could be misleading. To solve this problem, embodiments of the new LM may provide two well known correction options: Bonferroni and False Discovery Rate (FDR). Bonferroni is a conservative correction multiplying the original p-value by the number of tests computed. False Discovery Rate (FDR) is a less stringent alternative, factoring in variable parameter dependences by dividing Bonferroni p-values by their respective rank order.

Figure 5:
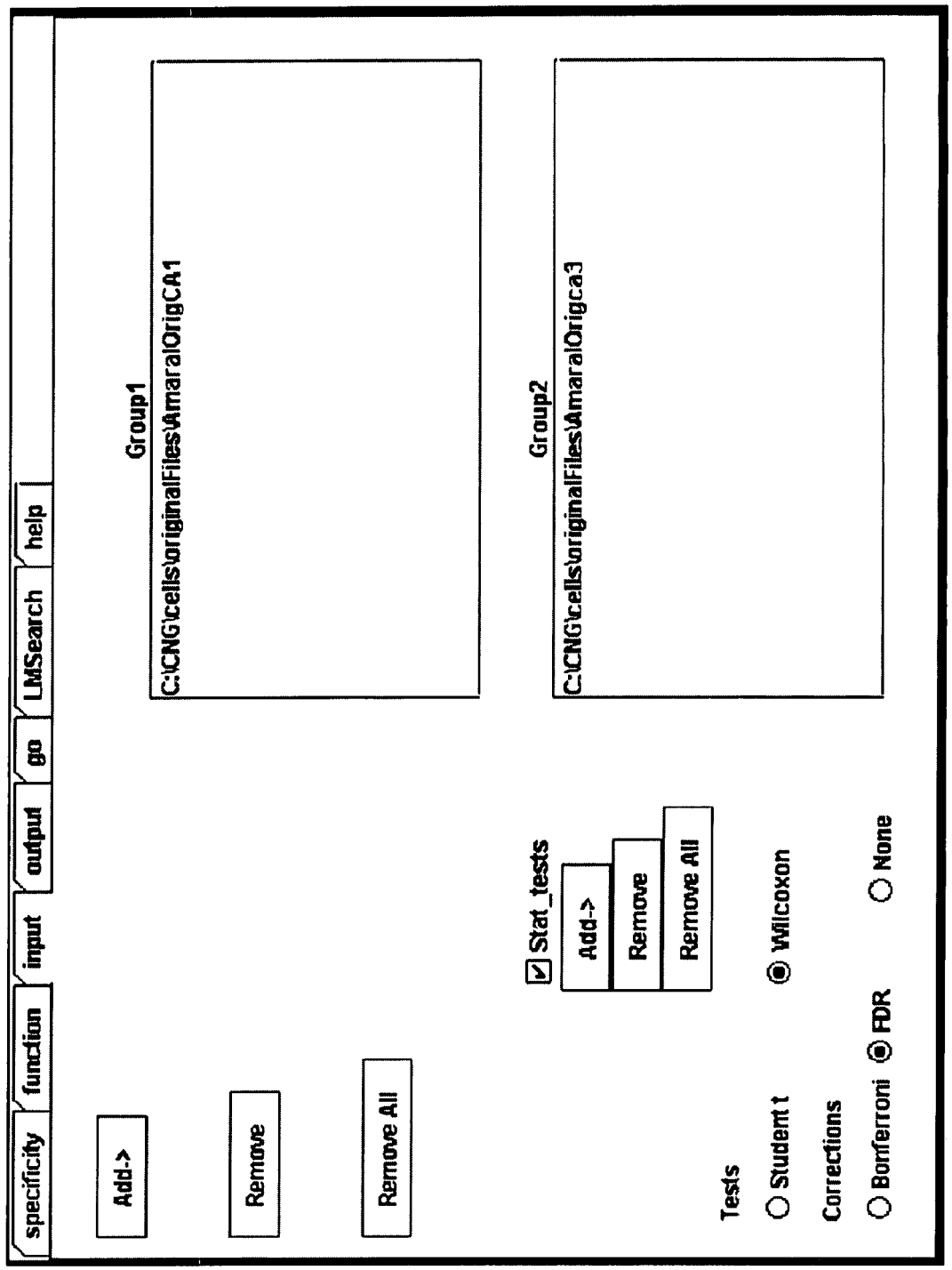
FIG. 5 shows an input panel with a statistical feature enabled as per an aspect of an embodiment of the present invention.
Figure 6:
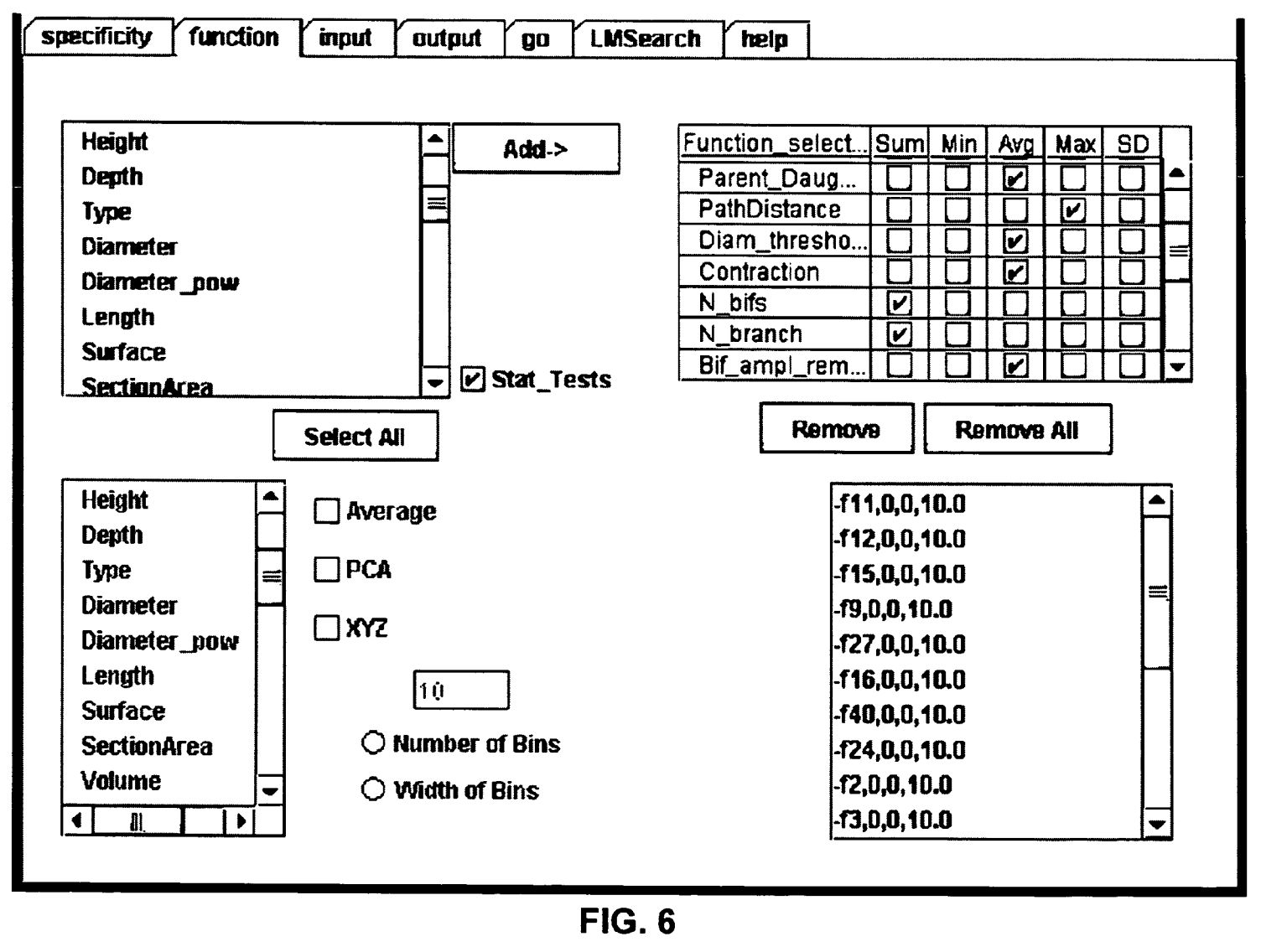

As illustrated, the statistical feature may be enabled in LM by selecting the stat_tests checkbox both in the Input and Function panels (see FIG. 5 and FIG. 6). FIG. 5 shows an input panel with a statistical feature enabled (note Stat_tests checkbox) and FIG. 6 shows a function panel with statistical features enabled. When the user selects and executes one of the available statistical tests, LM first extracts the morphological measures and then computes the statistical values returning the result on screen and (optionally) as a file on the user's local computer hard disk.

The user may select any of the available functions. As shown, for the statistical comparison each function is potentially represented by 5 values: Total Sum, Minimum value, Average, Maximum value and Standard deviation.

Given the metrics available, LM may provide the user with a large number of statistical possible comparisons. This large number of potential tests needs to be corrected with any of the available correction methods. The Bonferroni method is the most conservative of the two provided corrections.

Search capabilities as per embodiments of the present invention will now be discussed. Neuroanatomical studies can be computationally intensive. The selection of subgroups of neurons based on morphological characteristics may be integrated into LM as the Search panel. As an example it is possible to select all neurons with at least 500 terminal tips and at least 3 tree stems. The search function can be quite complex and may be user defined by a combination of LM functions and Boolean operators.

Figure 7:
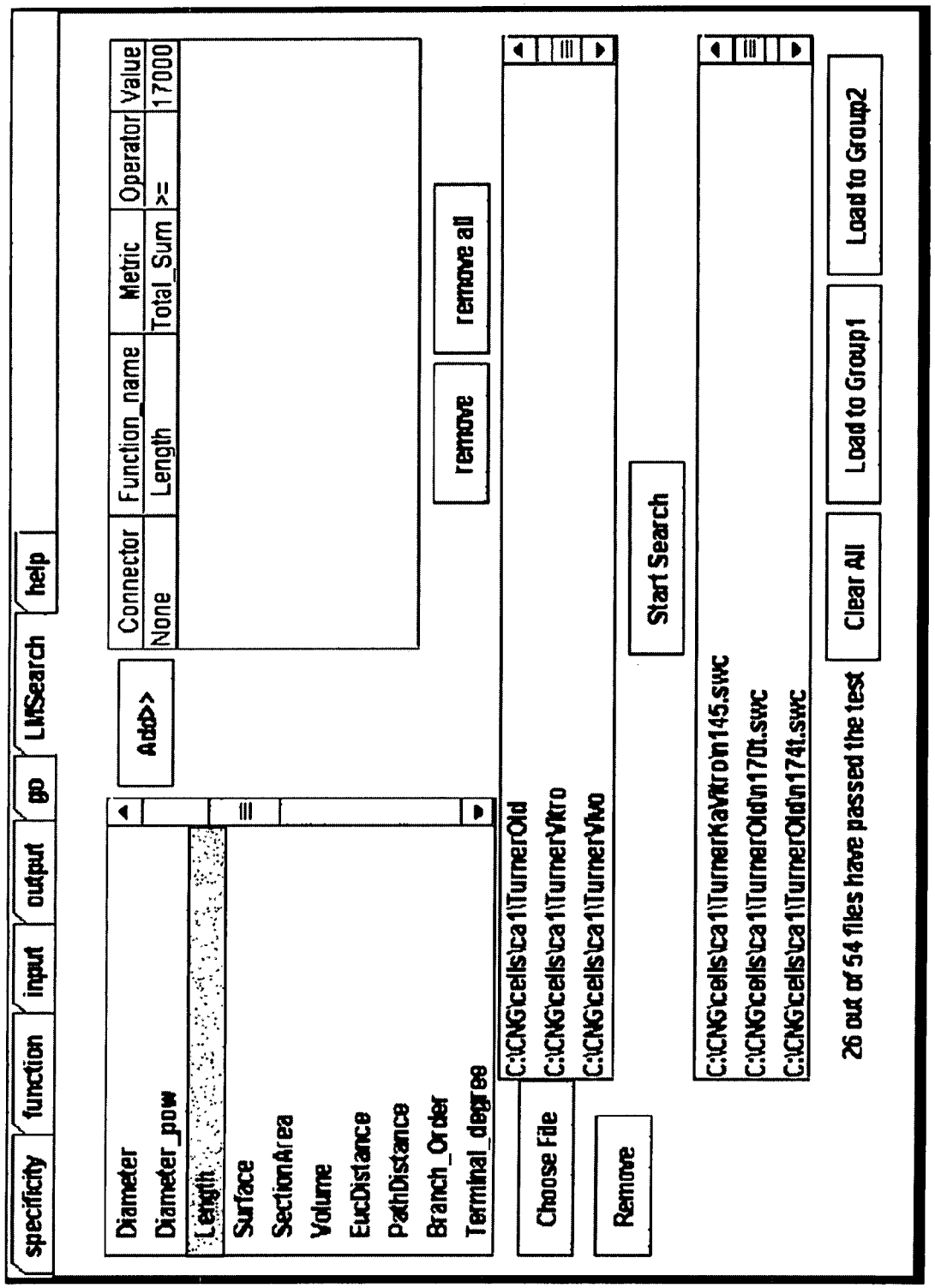
FIG. 7 shows a search panel as per an aspect of an embodiment of the present invention where a single search function based on total length greater or equal than 17000 is displayed.

FIG. 7 shows an example of a search panel where a single search function based on total length greater or equal than 17000 is displayed. The resulting output is represented by 26 neurons that satisfy the condition over a total of 54. This new panel may allow the user to perform such morphological searches.

The search panel can be used for making pre-selections for statistical comparison. For example it may be possible to partition a group of neurons in two sets based on a particular search function and load the resulting groups as group1 and group2 respectively (see FIG. 7 lower right part). This procedure can be employed to discover emerging parameters that are statistically different between the two sets.

Subtree analysis as per embodiments of the present invention will now be discussed. The ability to analyze any neuron as an independent set of single trees is the final major addiction to this LM version. This user friendly function can be activated by a single click on the Subtrees group checkbox in the Output panel.

When this function is activated, all neurons may be decomposed in subsets with each tree treated as a new neuron. This feature may be particularly useful for neurons with many stems. For example motoneurons in the spinal cord may have more than 10 stems. Using the Subtree feature, it may be possible to compute statistical analysis over 100 subtrees with only 10 reconstructed neurons.

Several examples will now be discussed. Three new LM features are disclosed. In particular, embodiments enable fully automated statistical comparison between two groups of reconstructed neurons. Just few point and click actions are required to obtain a full statistical description of morphological differences between two groups.

It is also possible to perform morphological searches. With this feature it may also be feasible to cluster databases of neurons in subgroups based on morphological characteristics.

These new features may also be combined to create complex scenarios. For example it is possible to extract all functions that are statistically different from 2 groups of neurons that are clustered based on total length.

Finally, a subtree analysis is disclosed to perform measurements based on stems instead of whole neurons.

To show the simplicity of LM use, a few examples are presented.

EXAMPLE 1

Extraction of Volume, Length, and Surface Data

Function panel: select Volume, Length and Surface metrics from top left metric list. Press Add button. All 3 metrics should now be listed in the top right white panel
Input panel: select top left Add button and select first neuron. Repeat this step until all neurons of interest are selected
Go panel: click on Go button and after a short computational time all results are displayed
An example of a correct analysis executed on two neurons is shown in FIG. 10
In particular each line can be read from right to left as:
neuron name
function name
total sum of the function over the neuron
number of compartments included
number of compartments excluded

EXAMPLE 2

Statistical Analysis on Two Set of Neurons Based on Volume, Length, and Surface Data Function panel: select Volume, Length and Surface metrics from top left metric list. Press Add button. All 3 metrics should now be listed in the top right white panel
Function panel: check Stat_tests checkbox. The top right panel display will show 5 checkboxes: one for each function
Function panel: select the Sum checkbox for each metric
Input panel: select top left Add button and select first neuron of group1. Repeat this step until all neurons of group1 are selected
Input panel: select checkbox Stat_tests
Input panel: select Add button below the Stat_tests and select first neuron of group2. Repeat this step until all neurons of group2 are selected
Go panel: click on Go button and after a short computational time all results are displayed
FIG. 11 shows an example of a correct analysis:

EXAMPLE 3

Search Neurons with Volume Greater than 2000 and Length Greater than 18000

Figure 8:
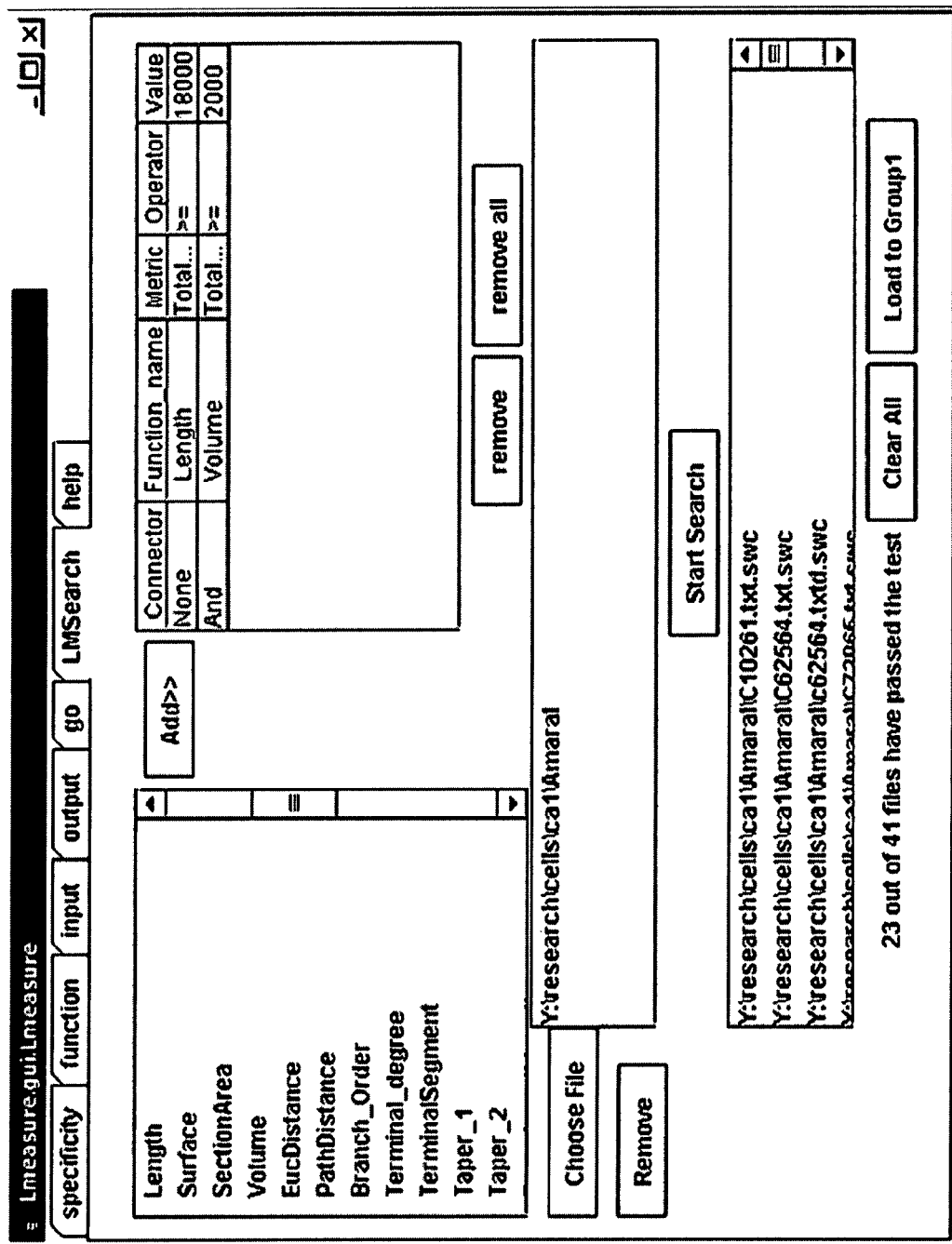
FIG. 8 shows a search as per an aspect of an embodiment of the present invention.

LMSearch panel: select Volume and Length metrics from top left metric list. Press Add button. All 2 metrics should now be listed in the top right white panel
LMSearch panel: select metric Total_Sum from right top panel for both functions
LMSearch panel: select operator >from Operator list for both functions
LMSearch panel: enter the value 18000 for the Length metric and the value 2000 for Volume
LMSearch panel: select Choose File and select either the first file or a directory containing the files to be searched. Repeat this step until all neurons are included
LMSearch panel: press Start Search button
FIG. 8 shows a correct search

EXAMPLE 4

Search Neurons with Volume Less than 2000 OR Length Greater than 18000

LMSearch panel: select Volume, and Length metrics from top left metric list. Press Add button. All 2 metrics should now be listed in the top right white panel
LMSearch panel: select Connector OR for the second function in the right list
LMSearch panel: select metric Total_Sum from right top panel for both functions
LMSearch panel: select operator <from Operator list for both functions
LMSearch panel: enter the value 18000 for the Length metric and the value 2000 for Volume
LMSearch panel: select Choose File and select either the first file or a directory containing the files to be searched. Repeat this step until all neurons are included

EXAMPLE 5

Statistically Analyze Outputs from Example 3 and Example 4

Execute Example 3
LMSearch panel: select Load to Group1
Execute Example 4
LMSearch panel: select Load to Group2. If the button cannot be found, enlarge the window
The previous 4 steps prepare the input for the analysis.
Follow the first 3 steps from Example 2
Go panel: click on Go button and after a short computational time all results are displayed
FIG. 12 shows an example of a correct analysis
By construction both Volume and Length report extremely low p-value. At the same time even Surface follow the same trend since its value is dependent on both volume and length.

EXAMPLE 6

Extraction of Volume, Length, and Surface Data Based on Subtrees

Figure 14:
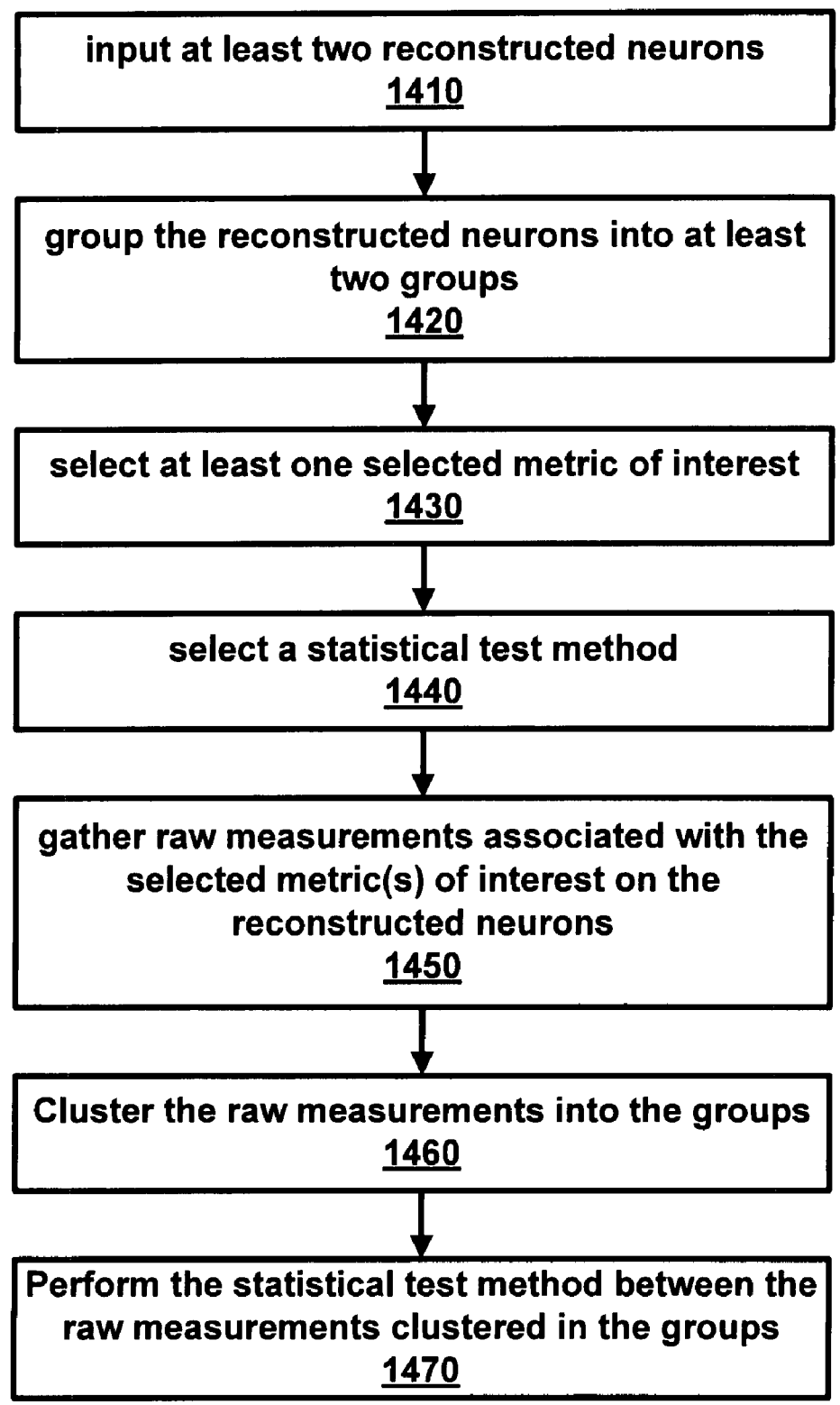
FIG. 14 is a flow diagram of an aspect of an embodiment of the present invention.

Function panel: select Volume, Length and Surface metrics from top left metric list. Press Add button. All 3 metrics should now be listed in the top right white panel
Input panel: select top left Add button and select first neuron. Repeat this step until all neurons of interest are selected
Output panel: select Subtrees Group checkbox
Output panel: select Analyze Subtrees
Go panel: click on Go button and after a short computational time all results are displayed.
FIG. 13 shows an example of a correct analysis executed on a single neuron with 9 trees Several embodiments will be discussed in light of the previous discussions with regard to FIGS. 14 through 19. FIG. 14 shows a flow diagram of an aspect of an embodiment of the present invention. The flow diagram illustrates a method that may be performed using one or more computing machines configured to read a series of computer readable instructions from a tangible computer readable medium such as a hard disc, an optical disc, a flash memory, or the like. The instructions may be executed by one or more processors in the computing machine to make neuronal measurements. Part or all of embodiments of the method may be performed over a network.

At least two digitally reconstructed neuronal morphologies [neurons] may be input to the computing machine at 1410. Digitally reconstructed neuronal morphologies may be obtained using many different neuron tracing systems such as Eutectic's Neuron tracing system, Microbrightfield's Neurolucida, the Nevin binary branch tree (BBT) syntax, the Douglas syntax and the like. Generally, these systems represent neuronal structure using a collection of points and connections in three dimensions. The different tracing systems use a variety of representations and vocabularies to describe the connectivity between points based on different conceptual models for the morphology data. The representations may be stored in a computer file. The generated files describing the digitally reconstructed neuronal morphologies may be flat text files in a format specific to the tool. One format that may be used is SWC which was developed by the Southampton Neurosciences Group, a cross—School initiative at the University of Southampton in Great Britain. Another file format is the Neurolucida file format. The neurolucida file format is developed by MicroBrightField, Inc. of Williston, Vt. Yet another data format for describing neuronal cell descriptions that uses Extensible Markup Language (XML) technology is MorphML developed at the University of Maine.

Reconstructed neuronal morphologies may represent 2-D or 3-D reconstructed neurons. Some or all of the digitally reconstructed neuronal morphologies may represent only part of a neuron or a subtree or a neuron.

At least two of the digitally reconstructed neuronal morphologies may be grouped into at least two groups at 1420. Preferably, each of the groups includes at least one of the reconstructed neurons.

At 1430, at least metric of interest may be selected. The metric(s) of interest preferably consider morphological measurements. As noted earlier, FIG. 9 enumerates many of the possible metrics including geometrical, angular, topological, and stereological measurements.

Statistical test method(s) that are to be used in making statistical comparisons between groups of neurons may be selected at 1440. Student T-test and the Wilcoxon Rank-sum test are examples of two possible statistical test methods. Further, the selected statistical test method(s) may include a combination of statistical tests. Correction factors such as Bonferroni, False Discovery Rate (FDR) or the like may be used with or as part of the statistical test method(s).

At 1450, raw measurements associated with the selected metrics of interest may be gathered on the digitally reconstructed neuronal morphologies. The raw measurements may then be clustered into the groups at 1460 and the selected statistical test method(s) may be performed between the raw measurements clustered in each of the groups at 1470."

Figure 15:
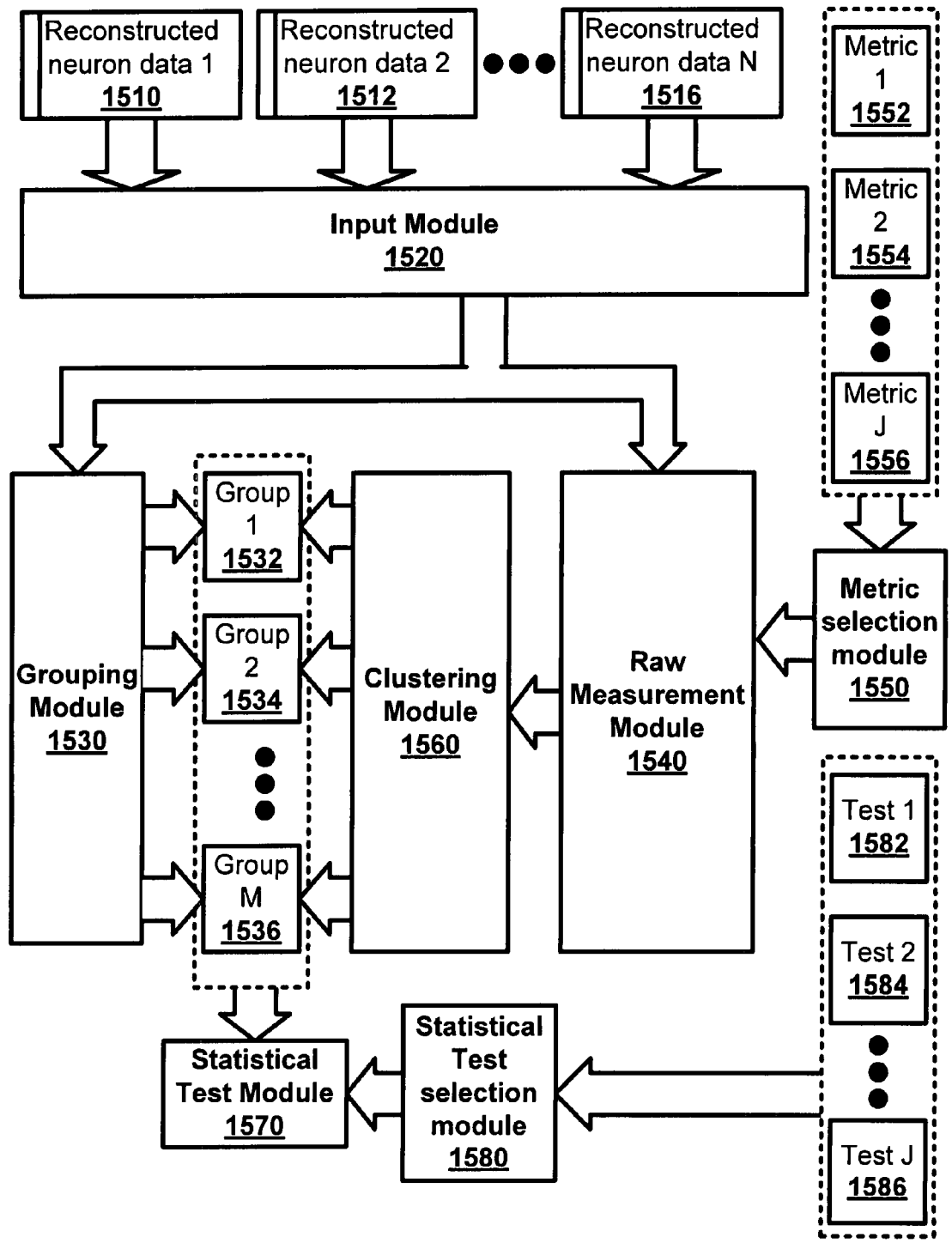
FIG. 15 is a block diagram of an aspect of another embodiment of the present invention.

FIG. 15 is a block diagram of another aspect of an embodiment of a neuronal measurement tool. This embodiment includes: an input module 1520, a grouping module 1530, a metric selection module 1550, a statistical test selection module 1580, a raw measurement module 1540, a clustering module 1560, and a statistical test module 1570. In this disclosure the term module means a self-contained component of a system, capable of interfacing with other components. In particular, it is anticipated that embodiments of the present invention may be constructed using software, hardware and network based modules. For example, the input module 1520 may receive reconstructed neurons 1510, 1512 and 1516 and pass them to the grouping module 1530 and raw measurement module 1540. The modules may actually be a self contained program or series of programs that may reside on the same computer, or reside across a network on other computers. The modules may be stored on a tangible computer readable medium as a series of processor executable instructions that when executed by one or more processors, performs their useful function. Similarly, a module may be constructed using hardware such as an ASIC, an FPGA, or discrete hardware. This may be useful in some instances to provide fast processing. For example, the raw measurement module 1540 may operate faster when instantiated using programmable hardware than if it were created using software alone on a general purpose computing machine.

The input module 1520 may be configured to input at least two digitally reconstructed neuronal morphologies (1510, 1512 and 1516). As described earlier, these digitally reconstructed neuronal morphologies may be stored on a 2-D or 3-D computer readable format using any number of digitally reconstructed neuronal morphology file formats such as the Neurolucida or SWC format.

Grouping module 1530 may be configured to group the digitally reconstructed neuronal morphologies into at least two groups. Each of the groups may include at least one of the reconstructed neurons. A metric selection module 1550 may be configured to select at least one metric of interest (1552, 1554 through 1556). The metric(s) of interest preferably consider morphological measurements such as those noted in FIG. 9.

Statistical test selection module 1580 may be configured to select a statistical test method from one or more statistical tests (1582, 1584 through 1586) such as student T-test or the Wilcoxon Test. Further, the selected statistical test method(s) may include a combination of statistical tests and/or correction factors such as Bonferroni, False Discovery Rate (FDR) or the like.

Raw measurement module 1540 may be configured to gather raw measurements associated with the metric(s) of interest on the digitally reconstructed neuronal morphologies. Clustering module 1560 may be configured to cluster the raw measurements into at least two of the groups. The clustering of neurons in to subgroups may be based on morphological characteristics such as those enumerated in FIG. 9. The statistical test module 1570 may be configured to perform the selected statistical test method between the raw measurements clustered in at least two of the groups.

Figure 16:
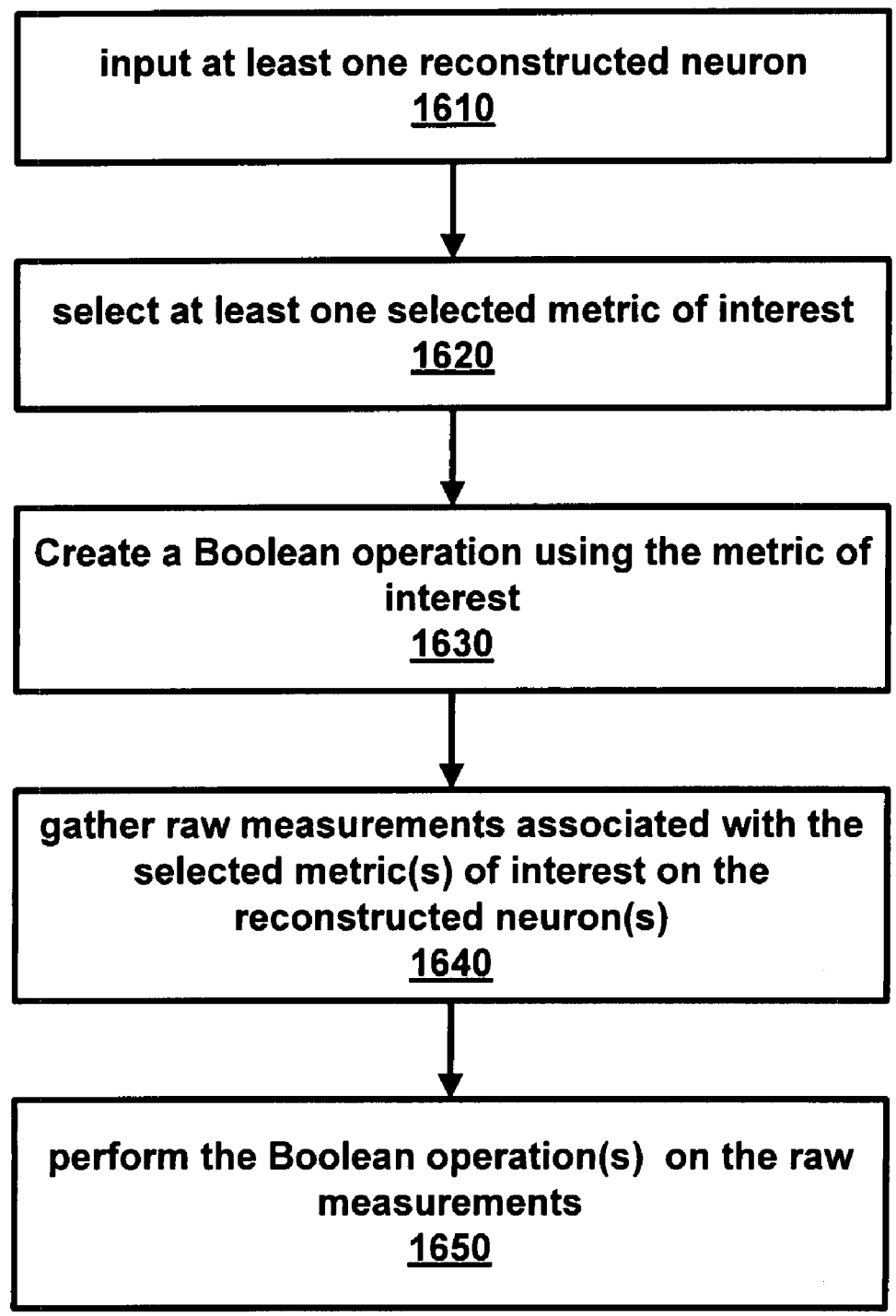
FIG. 16 is a flow diagram of an aspect of yet another embodiment of the present invention.

FIG. 16 is a flow diagram for making neuronal measurements as per an aspect of yet another embodiment. Again, this embodiment may be written as a series of computer instructions that may be stored on tangible computer readable medium such as a hard disk, and optical disk, a solid state memory or the like. The computer readable instructions may then be executed by one or more processors to perform the actions described in FIG. 16.

At 1610, digitally reconstructed neuronal morphologies may be received. The digitally reconstructed neuronal morphologies may have been generated by analyzing a neuron and stored on a computer readable medium using a digitally reconstructed neuronal morphology file format such as SWC. Additionally, the digitally reconstructed neuronal morphologies may be from a selected group. At least one metric of interest may be selected at 1620. A Boolean operation may be created using the metric of interest. In many cases the Boolean operation may include one or more values. Raw measurements associated with at least one of the metric(s) of interest" may be gathered on at least one of the digitally reconstructed neuronal morphologies at 1640. Groups of neurons that satisfy the Boolean operation on the raw measurements may be selected at 1650. The Boolean operation may include many elements including a neuronal measurement. Additionally, statistical test(s) may be performed using the result of the Boolean operation.

Figure 17:
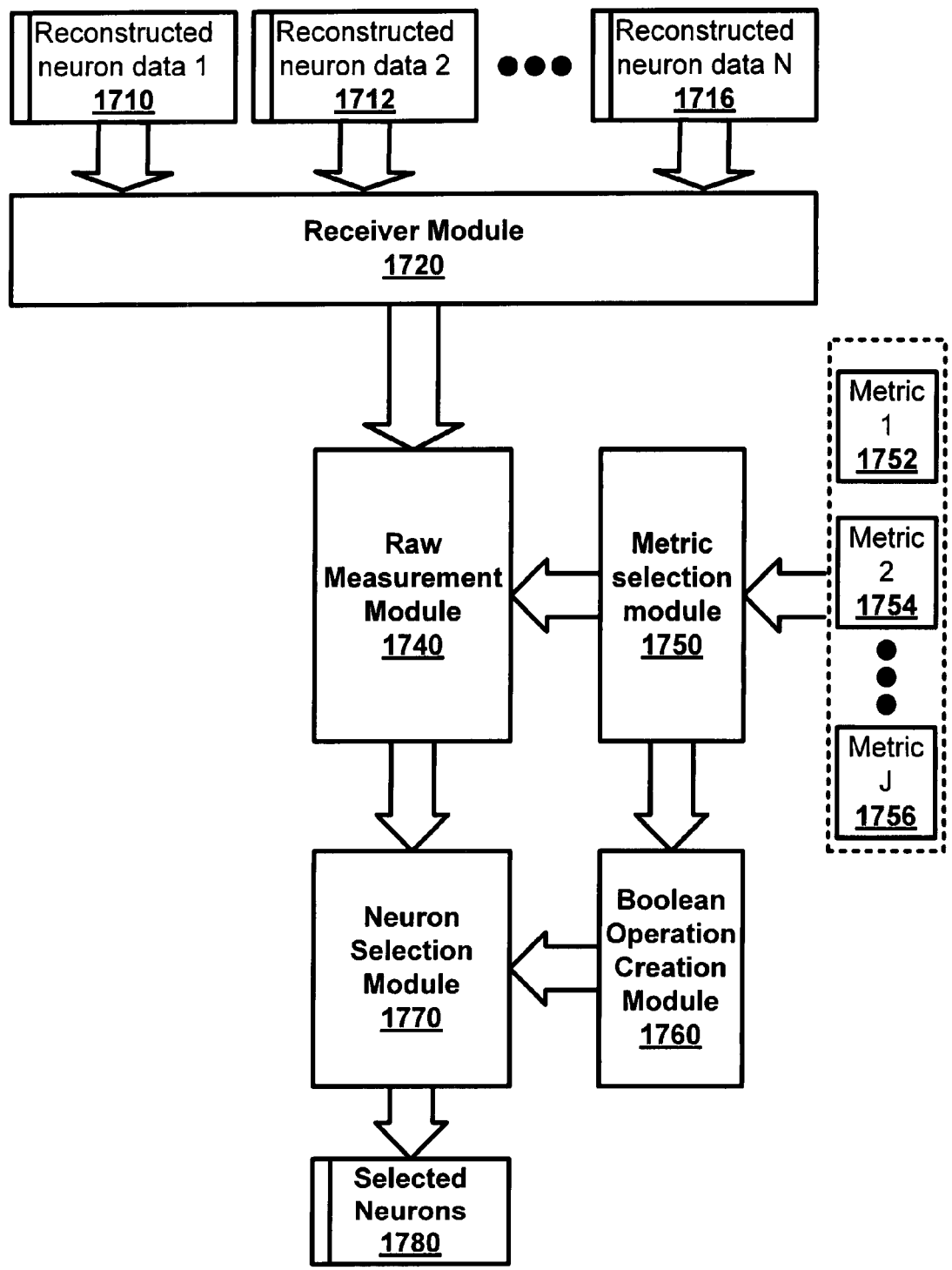
FIG. 17 is a block diagram of a neuronal search tool as per an aspect of an embodiment of the present invention.

FIG. 17 is a block diagram of a neuronal search tool as per an aspect of an embodiment of the present invention. As shown, this example neural search tool includes a receiver module 1720, a metric selection module 1750, a Boolean operation creation module 1760, a raw measurement module 1740, and a neuron selection module 1770. The receiver module 1720 may be configured to receive at least one digitally reconstructed neuronal morphology. The digitally reconstructed neuronal morphologies (1710, 1720 through 1716) may be generated by an analysis of a neuron. The metric selection module 1750 maybe configured to select at least one metric of interest. The Boolean operation creation module 1760 may be configured to create a Boolean operation using the metric of interest. The raw measurement module 1740 may be configured to gather raw measurements associated with at least one of the metric(s) of interest on at least one of the digitally reconstructed neuronal morphologies (1710, 1720 through 1716). The neuron selection module 1770 may be configured to select a selected group of neurons that satisfy the Boolean operation on the raw measurements.

Figure 18:
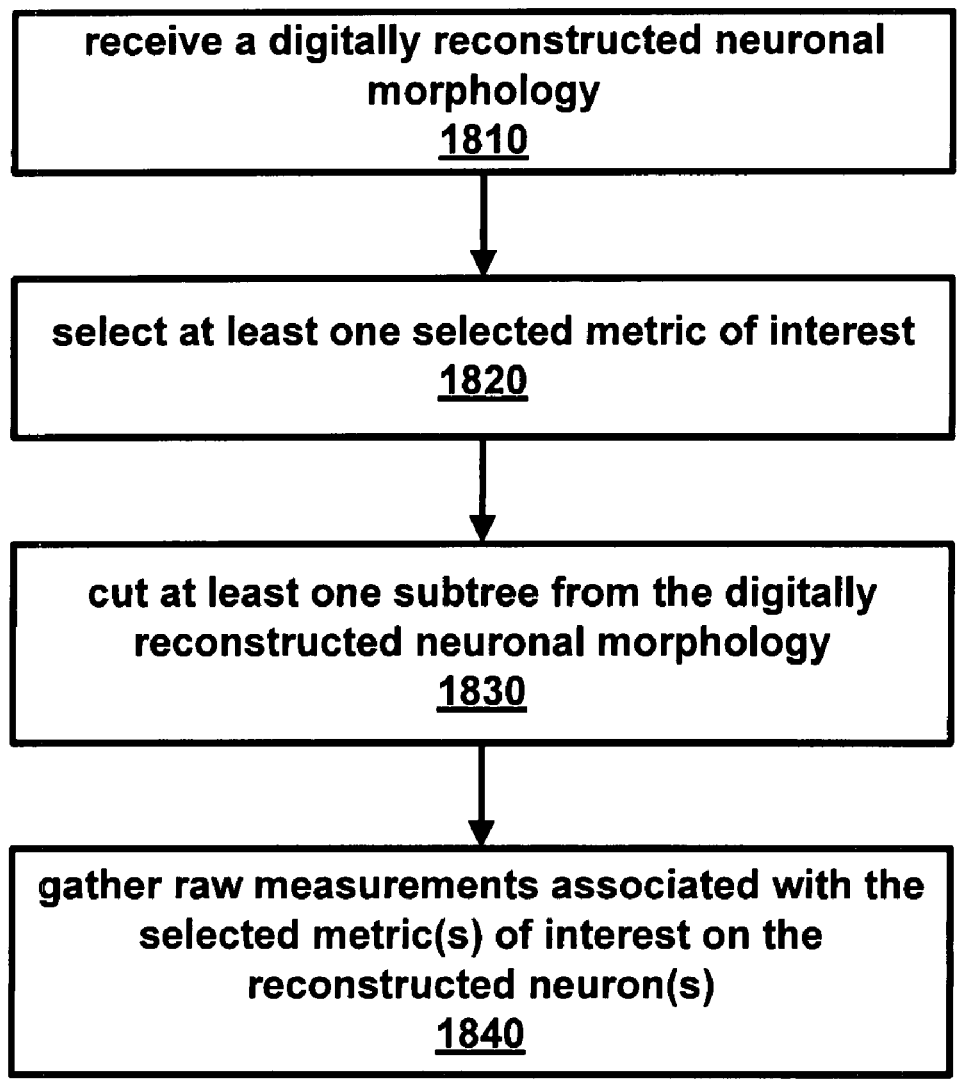
FIG. 18 is a flow diagram of an aspect of an embodiment of the present invention for making neuronal subtree measurements.
Figure 19:
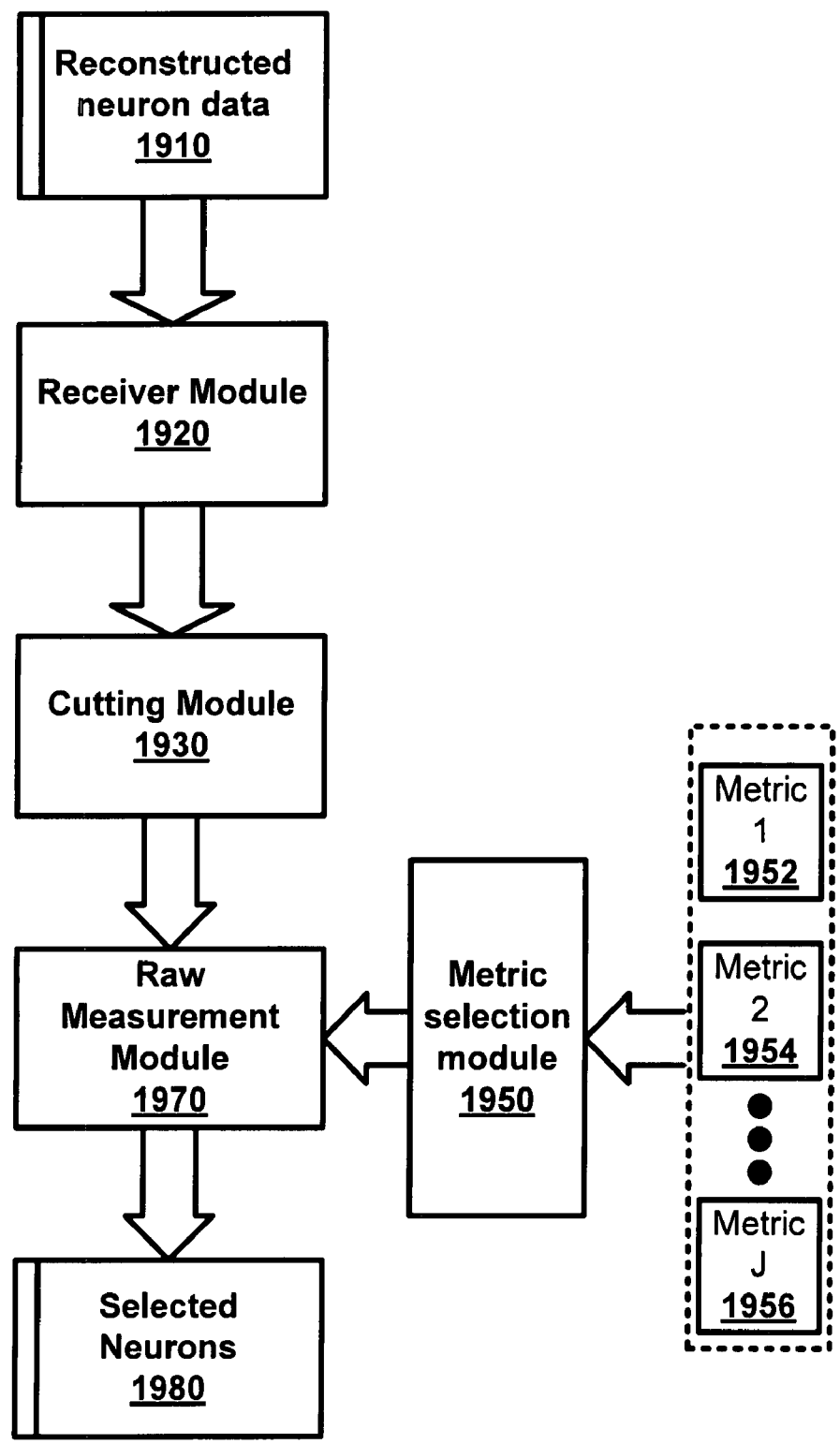
FIG. 19 is a block diagram of a neuronal subtree measurement tool as per an aspect of an embodiment of the present invention.

In some instances, it may be advantageous to be able to make neuronal measurements on only a part of a neuronal structure. FIGS. 18 and 19 address this desire.

FIG. 18 is a flow diagram of an aspect of an embodiment of the present invention for making neuronal subtree measurements. As stated before, this and other embodiments of the present invention may be implemented as a series of computer instructions that when executed by one or more processors performs the tasks described (as well as other equivalent variations). The instructions may be stored and distributed on computer readable media such as hard disks, floppy disks, solid state disks, optical disks and the like.

At 1810, a digitally reconstructed neuronal morphology may be received by a processing system. The system may select at least one metric of interest at 1820. It is possible that various embodiments may allow these actions to be performed in different orders. For example, the metric(s) of interest may be selected before the digitally reconstructed neuronal morphologies are received in some embodiments and selected after the digitally reconstructed neuronal morphologies are received in other embodiments. At 1830, at least one subtree may be cut from the digitally reconstructed neuronal morphology. The cut may be performed by eliminating the unwanted elements of the digitally reconstructed neuronal morphology from the file. In some cases, there may need to be some file housekeeping made to the file, such as possible indexes to the branches, file header data, end-of-file markers, etc. At 1840, raw measurements associated with the selected metric(s) of interest may be gathered on subtree(s).

FIG. 19 is a block diagram of a neuronal subtree measurement tool as per an aspect of an embodiment of the present invention. This illustrated example of an embodiment of a neuronal subtree measurement tool includes a receiving module 1920, a metric selection module 1950, a cutting module 1930, and a measurement module 1970. Receiving module 1920 may be configured to receive a digitally reconstructed neuronal morphology 1910. Metric selection module 1950 may be configured to select at least one metric of interest from a one or more metrics (1952, 1954 through 1956). Cutting module 1930 may be configured to cut at least one subtree from the digitally reconstructed neuronal morphology. Raw measurement module 1970 may be configured to gather raw measurements associated with the selected metric(s) of interest on subtree(s). The measured data 1980 on the subtree may be stored or output for use by other modules.

While various embodiments of the present invention have been described above, it should be understood that they have been presented by way of example, and not limitation. It will be apparent to persons skilled in the relevant art that various changes in form and detail can be made therein without departing from the spirit and scope of the present invention. In fact, after reading the above description, it will be apparent to one skilled in the relevant art how to implement the invention in alternative embodiments. For example, the above description discusses embodiments of the present invention as enhancements to L-Measure. However, one skilled in the art will recognize that embodiments may be built without the need to use or implement I-Measure. Additionally, the present invention is directed to measurements of neurons, however, embodiments may be applied to measuring other structures that have tree structures such other types of biological cells or physical structures such as computer networks. Thus, the present invention should not be limited by any of the above described exemplary embodiments.

In addition, it should be understood that any figures, schematic diagrams, system diagrams, or examples which highlight the functionality and advantages of the present invention, are presented for example purposes only. The architecture of the present invention is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Furthermore, it is the applicant's intent that only claims that include the express language means for or step for be interpreted under 35 U.S.C. 112, paragraph 6. Claims that do not expressly include the phrase means for or step for are not to be interpreted under 35 U.S.C. 112, paragraph 6.

The present invention can be made from a variety of materials, in a variety of shape and size, for a variety of purpose. The scope of the present invention is limited only by the claims as follows.

What is claimed is:

1. A method for making neuronal measurements using one or more processors configured to perform the method comprising:
    a) receiving at least two digitally reconstructed neuronal morphologies;
    b) grouping said at least two digitally reconstructed neuronal morphologies into at least two groups, each of said at least two groups including at least one of said at least two reconstructed neurons;
    c) selecting at least one selected metric of interest;
    d) selecting a statistical test method;
    e) gathering raw measurements associated with said at least one selected metric of interest on all of said at least two digitally reconstructed neuronal morphologies;
    f) clustering said raw measurements into each of said at least two groups; and
    g) performing said statistical test method between said raw measurements clustered in each of said at least two groups.

2. A method according to claim 1, wherein at least one of said at least two digitally reconstructed neuronal morphologies represents only part of a neuron.

3. A method according to claim 1, wherein at least one of said at least two digitally reconstructed neuronal morphologies represents a subtree.

4. A method according to claim 1, wherein said metric of interest considers morphological measurements.

5. A method according to claim 1, wherein said at least two digitally reconstructed neuronal morphologies are 3-D reconstructed neurons.

6. A method according to claim 1, wherein said at least two digitally reconstructed neuronal morphologies are represented in a computer file format.

7. A method according to claim 6, wherein said computer file format is a SWC format.

8. A method according to claim 1, wherein said selected statistical test method includes a Student T-test.

9. A method according to claim 1, wherein said selected statistical test method includes a Wilcoxon Test.

10. A method according to claim 1, wherein said selected statistical test method includes a combination of statistical tests.

11. A method according to claim 1, wherein said selected statistical test method includes a correction factor.

12. A method according to claim 1, wherein the method is partially performed over a network.

13. A neuronal measurement tool, comprising:
   a) an input module configured to input at least two digitally reconstructed neuronal morphologies;
   b) a grouping module configured to group the at least two digitally reconstructed neuronal morphologies into at least two groups, each of said at least two groups including at least one of said at least two reconstructed neurons;
   c) a metric selection module configured to select at least one metric of interest,
   d) a statistical test selection module configured to select a statistical test method;
   e) a raw measurement module configured to gather raw measurements associated with said at least one metric of interest on all of said at least two digitally reconstructed neuronal morphologies;
   f) a clustering module configured to cluster said raw measurements in at least two of said at least two groups; and
   g) a statistical test module configured to perform said statistical test method between said raw measurements clustered in at least two of said at least two groups; and
   wherein at least one of the modules uses at least one processor.

14. A medium according to claim 13, wherein the method is partially performed over a network.

15. A non-transitory tangible computer readable medium having computer instructions that when executed by one or more processors performs a method for making neuronal measurements, the method comprising:
   a) receiving at least one digitally reconstructed neuronal morphology, said at least one digitally reconstructed neuronal morphology generated by analyzing a neuron;
   b) selecting at least one metric of interest,
   c) creating a Boolean operation using said metric of interest;
   d) gather raw measurements associated with at least one of said at least one metric of interest on at least one of said at least one digitally reconstructed neuronal morphologies; and
   e) selecting a selected group of neurons that satisfy said Boolean operation on said raw measurements.

16. A medium according to claim 15, wherein said Boolean operation includes a value.

17. A medium according to claim 15, wherein said Boolean operation includes a neuronal measurement.

18. A medium according to claim 15, further including performing a statistical test using the result of said Boolean operation.

19. A medium according to claim 15, wherein at least one of said at least one digitally reconstructed neuronal morphologies represents only part of a neuron.

20. A medium according to claim 15, wherein at least one of said at least two digitally reconstructed neuronal morphologies represents a subtree.

21. A medium according to claim 15, wherein the method is partially performed over a network.

22. A medium according to claim 15, further including:
   a) receiving at least two digitally reconstructed neuronal morphologies, at least one of said at least two digitally reconstructed neuronal morphologies from said selected group;
   b) grouping said at least two digitally reconstructed neuronal morphologies into at least two groups, each of said at least two groups including at least one of said at least two digitally reconstructed neuronal morphologies;
   c) selecting at least one second metric of interest;
   d) selecting a statistical test method;
   e) gather raw measurements associated with said at least one second metric of interest on all of said at least two digitally reconstructed neuronal morphologies;
   f) clustering said raw measurements into each of said at least two groups; and
   g) performing said statistical test method between said raw measurements clustered in each of said at least two groups.

23. A neuronal search tool, comprising:
   a) a receiver module configured to receive at least one digitally reconstructed neuronal morphology, said at least one digitally reconstructed neuronal morphology generated by analyzing a neuron;
   b) a metric selection module configured to select at least one metric of interest,
   c) a Boolean operation creation module configured to create a Boolean operation using said metric of interest;
   d) a raw measurement module configured to gather raw measurements associated with at least one of said at least one metric of interest on at least one of said at least one digitally reconstructed neuronal morphologies; and
   e) a neuron selection module configured to select a selected group of neurons that satisfy said Boolean operation on said raw measurements; and
   wherein at least one of the modules uses at least one processor.

24. A neuronal subtree measurement tool, comprising:
   a) a receiving module configured to receive a digitally reconstructed neuronal morphology;
   b) a metric selection module configured to select at least one metric of interest;
   c) a cutting module configured to cut at least one subtree from the digitally reconstructed neuronal morphology; and
   d) a measurement module configured to gather raw measurements associated with said at least one selected metric of interest on at least one of said at least one subtree; and
   wherein at least one of the modules uses at least one processor.

* * * * *